United States Patent [19]

Canich

[11] Patent Number: 5,079,205
[45] Date of Patent: Jan. 7, 1992

[54] GROUP IVB, VB AND VIB METAL HYDROCARBYLOXIDES, WITH ALUMOXANE FOR OLEFIN POLYMERIZATION

[75] Inventor: Jo Ann M. Canich, Webster, Tex.

[73] Assignee: Exxon Chemical Patents Inc., Linden, N.J.

[21] Appl. No.: 553,485

[22] Filed: Jul. 13, 1990

[51] Int. Cl.$^5$ .......................... C08F 4/642; C08F 4/68; C08F 4/69
[52] U.S. Cl. .................................. 502/117; 502/103; 526/165
[58] Field of Search ............................... 502/103, 117

[56] References Cited

U.S. PATENT DOCUMENTS 4,536,484  8/1985  Lacombe et al. ...................... 502/62
4,701,432  10/1987  Welborn ............................. 502/103

FOREIGN PATENT DOCUMENTS 0099660  2/1984  European Pat. Off. .
0241560  10/1987  European Pat. Off. .

OTHER PUBLICATIONS

Chemical Abstract 105:173246z of JP 61-141708 to Ube Industries.
Chemical Abstract 108:222271b of JP 63-003008 to Indemitsu Kosan.
Chemical Abstract 107:96316j of JP 62-072631 to Mitsui, "Oligomerization of Alpha Olefins," 1987.
Chemical Abstract 99:105887s of Polish Patent PL 116,247, Nowakowska et al., "Olefin Polymerization," 1982.
Chemical Abstract 108:151944s on an article by Oliva, L. and Pellechia, C., "Isotactic Polypropylene by Polymerization of Propene in the Presence of Some Achiral Soluble Transition Metal Compounds and Methylaluminoxane," *Makromol. Chem., Rapid Commun.*, 9(2), pp. 51–5 (1988).
Miyatake, T.; Mizunuma, K.; Seki, Y.; Kakugo, M., "2,2'-Thoibis(6-Tert-Butyl-4-Methylphenoxy)-Titanium or Zirconium Complex-Methylalumoxane Catalysts for Polymerization of Olefins," *Makromol. Chem., Rapid Commun.*, 10, 349-352 (1989).
Longo, P., Pellecchia, C., "Isotactic Polypropylene by Polymerization of Propene in the Presence of Some Archial Soluble Transition Metal Compounds and Methylaluminoxane," *Makromolo. Chem., Rapid Commun.*, 9, 51-55 (1988).

*Primary Examiner*—Patrick P. Garvin
*Attorney, Agent, or Firm*—Jaimes Sher; M. B. Kurtzman

[57] ABSTRACT

The invention is a catalyst system including a Group IVB, VB or VIB transition metal hydrocarbyloxide component and an alumoxane component which may be employed in liquid, slurry or bulk phase reactors to polymerize ethylene and α-olefins to produce a high molecular weight, narrow molecular weight distribution homo- and co-polymer.

19 Claims, No Drawings

GROUP IVB, VB AND VIB METAL HYDROCARBYLOXIDES, WITH ALUMOXANE FOR OLEFIN POLYMERIZATION

FIELD OF THE INVENTION

This invention relates to a catalyst and to a process using such catalyst for preparing polyolefins by liquid, solution, slurry, high pressure fluid, bulk or gas phase polymerization of the requisite monomers. The catalyst comprises a Group IVB, VB, or VIB transition metal hydrocarbyloxide compound which, when cocatalyzed with an alumoxane, provides an active catalyst system.

BACKGROUND OF THE INVENTION

As is well known to those skilled in the art, various processes and catalysts exist for the homopolymerization or copolymerization of α-olefins. For example, processes are known for polymerizing ethylene or propylene, either alone or in the presence of small quantities of other monomers, to produce plastics. These plastics are typically used in such applications as blow and injection molding, extrusion coating, film and sheeting, pipe, wire and cable.

It is known that catalysts of a type generally described as Ziegler catalysts are useful for the polymerization of olefins under moderate conditions of temperature and pressure. It is also well known that the properties of polymer resin product obtained by polymerizing olefins in the presence of Ziegler-type catalysts vary greatly as a function of the monomers of choice, catalyst components, catalyst modifiers and a variety of other conditions which affect the catalytic polymerization process.

Important among properties of polymer resins is the average molecular weight and molecular weight distribution of the polymer. High molecular weights generally signify polymers having high strength properties. The melt index value ("MI") of a polymer is a measure of its average molecular weight. However two different polyethylene resins can have the same MI value and be significantly different in the distribution of the number of molecules of various molecular weights that make up the average molecular weight of the resin. Even though different resins may have the same MI value, one resin might have very different quantities of high molecular weight and low molecular weight fractions and thus exhibit very different processing characteristics and properties. Thus, the molecular weight distribution ("MWD") provides important additional information about the processability and mechanical properties of a polymer. The MWD may be determined by gel permeation chromatography measurements. Alternatively, another measure of the breadth of the MWD is Melt Index Ratio ("MIR").

Among Ziegler-type catalysts, supported vanadium catalysts are known for a tendency to produce polyethylene resins having a broad MWD. By reason of the resin's broad MWD a significant portion of the resin material may exist as polyethylene polymer chains having a low degree of polymerization, i.e. ethylene oligomers. As an example, European patent publication 099 660 teaches that unless certain precautions are taken, such ethylene oligomers are formed. The presence in the polyethylene resin of a significant proportion of low molecular weight oils or ethylene oligomers in the $C_{10}$-$C_{32}$ range poses certain disadvantages to the use of such resin for blow molding applications. The ethylene oligomers have relatively low boiling points, and at elevated temperatures during processing of the polyethylene resin to form useful articles, such as blow molding of household or industrial containers, in which the resin is heated to about 400° F. the ethylene oligomers in the resin vaporize, and, upon exposure to ambient air, condense into airborne droplets, making smoke. The smoke is considered objectionable by processors and impairs acceptability of broad MWD polyethylene resin products. Further, such low molecular weight oils can have other adverse effects. For example, since such materials have a waxy nature, they can exude into mold vent holes causing plugging of the hole and thus poor operation.

Among catalyst systems useful for thermoplastic polyolefin production are those utilizing a catalyst component in combination with an alumoxane cocatalyst. For example, U.S. Pat. No. 4,536,484 to Lacombe et al teaches a variation of the traditional Ziegler-Natta catalyst wherein the aluminum alkyl cocatalyst is replaced with the reaction product of an alumoxane and a magnesium composition. The magnesium composition is of the formula $Y_aMg_mX_b$ wherein Y is an alkyl or alkoxy group having from 1 to 12 carbon atoms, X is a halogen, m is greater than or equal to 1 and a+b=2m. The reaction between the magnesium composition and alumoxane is carried out in an inert liquid medium. The resulting organo-magnesium-aluminum product is then subjected to chlorination and treatment with a transition metal compound wherein the transition metal is titanium, zirconium, vanadium, or chromium. Preferred transitional metal compounds include $Ti(OR)_pCl_{4-p}$ and $Zr(OR)_pCl_{(4-p)}$ wherein R is a $C_1$-$C_8$ alkyl radical and p is from 1 to 4. The catalyst may be supported on an inorganic or organic support and consequently may be used in gas or slurry phase reactors. The catalyst is said to be useful for the polymerization of $C_2$-$C_{18}$ α-olefins, conjugated and non-conjugated dienes. The polymers produced using the Lacombe catalysts have melt flow ratios (MFR) in excess of about 30, indicating a broad molecular weight distribution.

The Chemical Abstract (105:173246z) of JP 61-141708 of Ube Industries relates to a solid catalyst system said to be useful for the production of a low halogen content polyethylene. One component of the catalyst system is a composition containing magnesium, a halide and a transition metal while the other component is an alumoxane. The first component is prepared by contacting a magnesium compound such as a magnesium halide, a hydroxy magnesium halide, a dialkoxy magnesium composition, etc. with a halogen containing compound such as aluminum, tin or silicon halides, alkoxysilane halides, etc. The product of this reaction is then treated with a transition metal composition preferably a titanium composition, such as $TiX_m(OR)_{4-m}$ wherein X is a halogen, R is $C_1$-$C_6$ alkyl and m is 1 to 4; or $P_mTiX_{4-m}$ wherein P is $C_4$-$C_6$ alkyl; or vanadium halide or vanadium oxyhalide compounds.

The Chemical Abstract (107:96316j) of JP 62-072631 to Mitsui relates to a catalyst system for the production of dimers or oligomers of α-olefins. The catalyst system includes a transition metal component, a phosphorous ester/soluble magnesium component and, optionally, an alumoxane. The transition metal component may include bis-butoxytitanium dichloride, [Ti(OBu)$_2$Cl$_2$] tetrakis-butoxytitanium [Ti(OBu)$_4$], or tetrakis-2 ethylhexoxytitanium [Ti(O-2-ethylhexyl)$_4$].

Chemical Abstract (108:222271b) also lists Idemitsu Kosan's JP 63-003008 which relates to the production of polyolefins which are said to be of "high purity" and "high molecular weight." Idemitsu's process uses a catalyst system including oxygen-containing titanium compounds and the reaction product of water and organic aluminum compounds (apparently lo alumoxane compositions). The titanium compounds include those of the formulae: $Ti(OR)_nX_{4-n}$, $Ti(OR)_m(OR')_{4-m}$, $Ti(OR)_k(OCOR)_{4-k}$ or $RO(Ti(OR)_2O)_p$-R wherein R and R' are $C_1$-$C_{20}$ alkyl groups, X is a halogen, n is greater than 0 but less than or equal to 4, m and k are less than 4 but greater than 0, and p is greater than or equal to 2 but less than or equal to 20.

The Chemical Abstract (99:105887s) of Polish patent pL 116,247 discloses a supported transitional metal complex-alumoxane catalyst system for the production of polyethylene having a molecular weight of about 82,000 and a bulk density of 480 g/dm$^3$. The transitional metal complex of the catalyst system is of the formula: $Ti(OR)_nCl_{3-n}$ wherein n equals 0-3 and R is phenyl, $C_2$-$C_{10}$ alkyl, chlorinated phenyl or chlorinated $C_2$-$C_{10}$ alkyl.

Chemical Abstract (108:151044s) on an article by Oliva et al. in *Makromol. Chem., Rapid Commun.*, 9(2), pp 51-5 (1988) relates to the production of polypropylene in the presence of soluble transition metal compounds and alumoxane as the catalyst system. The disclosure indicates that the solution process may employ tetrakis-butoxytitanium [Ti(OBu)$_4$], tetrakis-phenylzirconium [Zr(Ph)$_4$] or tetrakis phenyltitanium [Ti(Ph)$_4$] in combination with methylalumoxane as an effective catalyst system for propylene polymerization.

European Patent Application 241,560 describes a catalyst system the transition metal component of which is a hydrocarbyloxide compound. In that embodiment of the catalyst system comprising a tetrakishydrocarbyloxide transition metal compound (exemplified by propoxy and butoxy species of titanium and zirconium) or a bis-hydrocarbyloxide transition metal dihalide (exemplified by bis-phenoxy titanium dichloride) cocatalyzed by an alumoxane, the catalyst system is shown to polymerize propylene to an amorphous polypropylene of high molecular weight. In a second embodiment of the catalyst system, a transition metal halide is first reacted with an organic compound having at least two hydroxy groups to form a product compound wherein the two hydroxy groups of the organic compound are bonded to one transition metal atom. The product transition metal compound may be viewed as a bihydrocarbyloxide derivative wherein the hydrocarbyloxide ligands are interbridged one with another. Cocatalyzing this interbridged bihydrocarbyloxide transition metal compound with an alumoxane provides a catalyst system which polymerizes propylene to a crystalline polymer the isotactic stereoregularity of which depends upon the type of bihydroxy organic compound used to produce the transition metal derivative. Similarly, Miyatake et al., *Makromol. Chem., Rapid commun.*, 10, pp. 349-352 (1989) describes the reaction of 2,2'-thiobis(6-t-butyl-4 methylphenol) to form titanium and zirconium derivatives having a bidentate ligand which, when cocatalyzed with methyalumoxane, provides a catalyst system which is active for ethylene and propylene polymerization.

From the above, it is clear that efforts have been directed toward the development of olefin polymerization wherein a transition metal complex is employed in combination with an alumoxane. Some of these transition metal complexes have included transition metals complexed with hydrocarbyloxide groups wherein the hydrocarbyl ligand is an alkyl or an aryl ligand. Those references which do indicate the MWD of the polymer product of the prior catalyst systems show a broad MWD of greater than about 30 MFR. It would be desirable to develop a catalyst system highly active for olefin polymerization which comprises a transition metal/alumoxane complex which allows the production of a polymer having both high molecular weight and a narrow MWD.

SUMMARY OF THE INVENTION

The invention is a catalyst system comprising, a Group IVB, VB or VIB transition metal hydrocarbyloxide component and an alumoxane component, which may be employed in liquid, solution, slurry, high pressure fluid, bulk or gas phase reactors to polymerize olefins, diolefins, acetylenically unsaturated monomers, ethylene or $C_3$ to $C_{20}$ α-olefins alone or in combination with one or more $C_3$ to $C_{20}$ α-olefins or other unsaturated monomers to produce high molecular weight, narrow molecular weight distribution homopolymers and copolymers.

Transition metal hydrocarbyloxide compounds useful in preparing catalyst systems of this invention are represented by the formulae:

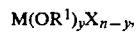

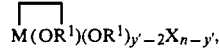

or

wherein M is a Group IVB, VB or VIB transition metal; each X is independently halogen, or a hydrocarbyl, alkoxy or an amide group having from one to 30 carbon atoms; $R^1$ is a hydrocarbyl radical of the formula

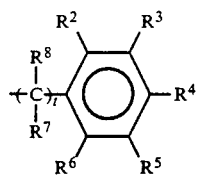

or

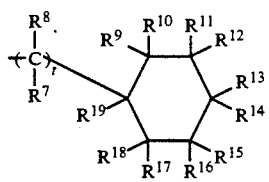

wherein "t" is an integer number of 0 to 10 and each of the $R^2$ to $R^{19}$ substituents are independently hydrogen, halogen, a hydrocarbyl group such as a straight or branched chain alkyl group, an aryl group, an alkylaryl group, an arylalkyl group, a halogenated hydrocarbyl group, an alkoxy group, an amine group, or at least two of the substituents $R^2$ to $R^6$ or $R^9$ to $R^{19}$ may be a single hydrocarbylene radical which forms a fused polycyclic ring system or a polynuclear aromatic system; "n" is a number at least equal to 4 and is equal to the valence of the transition metal M; and "y" is a number equal to or greater than 2 and less than or equal to "n", "y'" is a number equal to or greater than 3 and less than or equal to "n", and "y''" is a number equal to or greater than 4 and less than or equal to "n". $R^7$ and $R^8$ may independently be the same as the cyclic group containing $R^2$ to $R^6$ or $R^9$ to $R^{19}$ when t=1. $R^1$ is preferably a bulky ligand selected to provide steric hinderance which should prevent the dimerization or association of two or more of the transition metal hydrocarbyloxides. It is therefore preferably that $R^1$ be selected from those large oxy ligands such as substituted phenoxy ligands or substituted cyclohexoxy ligands. Substituted phenoxy ligands such as 2,6-disubstituted and 2,4,6-trisubstituted phenoxy ligands are preferred.

The alumoxane component of the catalyst system may be represented by the formulae:

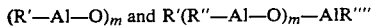

$(R'—Al—O)_m$ and $R'(R''—Al—O)_m—AlR''''$ or mixtures thereof, wherein R', R'', R''' and R'''' are independently a univalent anion ligand such as a $C_1$–$C_5$ alkyl group or halide and "m" is an integer from 1 to about 50, and "m" is preferably from about 13 to about 25.

Catalyst systems of the invention may be prepared by placing the transition metal hydrocarbyloxide compound and the alumoxane in common solution in a normally liquid alkane or aromatic solvent, which solvent is preferably suitable for use as a polymerization diluent for the liquid phase polymerization of one or more olefin monomer(s).

A typical polymerization process of the invention such as for the polymerization or copolymerization of olefins comprises the steps of contacting ethylene or $C_3$ to $C_{20}$ α-olefins alone, or with other unsaturated monomers including $C_3$–$C_{20}$ α-olefins, $C_5$–$C_{20}$ diolefins, and/or acetylenically unsaturated monomers either alone or in combination with other olefins and/or other unsaturated monomers, with a catalyst comprising, in a suitable polymerization diluent, the hydrocarbyloxide compound illustrated above and a methylalumoxane in an amount to provide a molar aluminum to transition metal ratio of from about 1:1 to about 20,000:1 or more; and reacting such monomer in the presence of such catalyst system at a temperature of from about −100° C. to about 300° C. for a time of from about 1 second to about 10 hours to produce a polyolefin having a weight average molecular weight of from about 500 or less to about 2,000,000 or more, typically from about 1,000 to about 1,000,000 and a molecular weight distribution of from about 1.5 to about 15.0.

DESCRIPTION OF THE PREFERRED EMBODIMENTS

The catalyst system of this invention comprises a hydrocarbyloxide compound of a Group IVB, VB or VIB transition metal of the Periodic Table of Elements (CRC Handbook of Chemistry and Physics. 68th ed. 1987-86) in combination with an alumoxane cocatalyst. Catalyst systems of this invention may be used in liquid, solution, slurry, high pressure fluid, bulk or gas phase reactors to produce homo- and co- polyolefins of high weight average molecular weight (MW) and narrow molecular weight distribution (MWD). If desired, a catalyst system of this invention may be used together with another catalyst system of conventional composition to form a mixed catalyst system to produce polymer products of a broadened or bimodal MWD. Catalyst Components The transition metal hydrocarbyloxide component used in preparing catalyst systems of this invention are represented by the formulae:

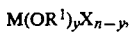

$M(OR^1)_y X_{n-y}$,

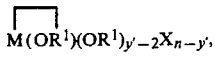

$M(OR^1)(OR^1)_{y'-2} X_{n-y'}$, or

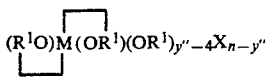

$(R^1O)M(OR^1)(OR^1)_{y''-4} X_{n-y''}$ wherein M is a Group IVB, VB or VIB transition metal; each X is independently halogen, or a hydrocarbyl, alkoxy or an amide group having from one to 30 carbon atoms; $R^1$ is a hydrocarbyl radical of the formula:

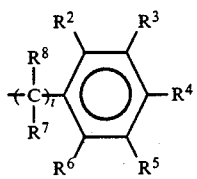

or

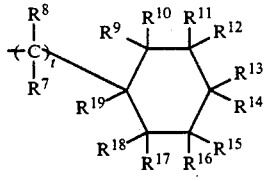

wherein "t" is an integer number of 0 to 10 and each of the $R^2$ to $R^{19}$ substituents are independently hydrogen, halogen, a hydrocarbyl group such as a straight or branched chain alkyl group, an aryl group, an alkylaryl group, an arylalkyl group, a halogenated hydrocarbyl group, an alkoxy group, an amine group or at least two of the substituents $R^2$ to $R^6$ or $R^9$ to $R^{19}$ may be a single hydrocarbylene radical which form a fused polycyclic ring system or a polynuclear aromatic system, "n" is a number at least equal to 4 and is equal to the valence of the transition metal M; "y" is a number equal to or greater than 2 and less than or equal to "n", "y'" is a number equal to or greater than 3 and less than or equal to "n", and "y''" is a number equal to or greater than 4 and less than or equal to "n". Preferably $R^1$ is a hydroarbyl radical wherein "t" is 0 to 4, and when "t" is 1, $R^7$ and $R^8$ may independently be the same as the cyclic group containing $R^2$ to $R^6$ or $R^9$ to $R^{19}$. More preferably, $R^1$ is of the formula:

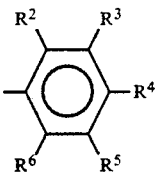

wherein $R^3$ and $R^5$ are as defined before and at least $R^2$ and $R^6$ are hydrocarbyl or hydrocarbyloxy substituents.

Transition metal hydrocarbyloxide compounds which, when cocatalyzed with an alumoxane, act as single-sited catalysts for olefin polymerization and hence produce narrow MWD polyolefins which are preferred. Accordingly, the preferred transition metal hydrocarbyloxide components are those of the Group IVB, VB and VIB transition metals (M) which are least susceptible to reduction and wherein the $R^1$ hydrocarbyl radical has sufficient bulk as to prevent dimerization or association of two or more of the transition metal hydrocarbyloxides due to steric hinderance. The preferred transition metals are those of Group IVB and VB. Preferably the $R^1$ hydrocarbyl radical is an aromatic radical wherein at least the $R^2$ and $R^6$ substituents are hydrocarbyl or hydrocarbyloxide radicals having from 1 to 20 carbon atoms.

Particularly useful for preparing catalyst systems which produce high molecular weight narrow MWD polyolefins are those transition metal hydrocarbyloxide compounds where the hydrocarbyl radical $R^1$ is 2,6-disubstituted and 2,4,6-trisubstituted with alkyl, aryl, alkylaryl, arylalkyl or alkoxy substituents. Illustrative compounds are the:

(A) tetrakis-2,6-disubstituted phenoxy Group IVB transition metal compounds [$M(OR^1)_4$; M is Group IVB metal; $R^3$, $R^4$, $R^5$ are hydrogen] wherein the substituents [$R^2$ and $R^6$] are each, independently, methyl, ethyl, isopropyl, tert-butyl, phenyl or the like, as for example:
  (1) tetrakis-2,6-di-tert-butylphenoxy zirconium;
  (2) tetrakis-2-methyl-6-tert-butylphenoxy hafnium;
  (3) tetrakis-2,6-diphenylphenoxy titanium:
(B) tetrakis-2,4,6-trisubstituted phenoxy Group IVB transition metal compounds [$M(OR^1)_4$; M is a Group IVB metal; $R^3$ and $R^5$ are hydrogen] wherein the substituents [$R^2$, $R^4$ and $R^6$] are each, independently, methyl, ethyl, isopropyl, tert-butyl, phenyl or the like and the $R^4$ substituent may be an alkoxy or another univalent anionic ligand, as for example;
  (1) tetrakis-2,4,6-trimethylphenoxy hafnium;
  (2) tetrakis-2,6-di-tert-butyl-4-methoxyphenoxy zirconium:
(C) tris-2,6-disubstituted phenoxy Group IVB transition metal compounds [$M(OR^1)_3X$; M is a Group IVB metal; $R^3$, $R^4$, $R^5$ are hydrogen; X is halogen or a psuedo halogen group such as a hydrocarbyloxide or amide] wherein the substituents [$R^2$ and $R^6$] are each, independently, methyl, ethyl, isopropyl, tert-butyl, phenyl or the like, as for example;
  (1) tris-2,6-di-tert-butylphenoxy zirconium chloride;
  (2) tris-2,6-di-tert-butylphenoxy hafnium methoxide;
(D) Tris-2,4,6-trisubstituted phenoxy Group IVB transition metal compounds [$M(OR')_3X$; M is a Group IVB metal; $R^3$ and $R^5$ are hydrogen; X is a halogen or a pseudo halogen group such as a hydrocarbyloxide or amide] wherein the substituents [$R^2$, $R^4$ and $R^6$] are each independently, methyl, ethyl, isopropyl, tert-butyl, phenyl or the like and the $R^4$ substituent may be an alkoxy or other univalent anionic ligand, as for example;
  (1) tris-2,6-di-tert-butylphenoxy-4-methoxy zirconium chloride;
  (2) tris-2,6-di-tert-butylphenoxy-4-N,N'-dimethyamino hafnium chloride:
(E) tris-2,6-disubstituted phenoxy hydrocarbyl Group IVB transition metal compounds [$M(OR^1)_3X$; M is a Group IVB metal; $R^3$, $R^4$ and $R^5$ are hydrogen; X is a hydrocarbyl radical] wherein the substituents [$R^2$ and $R^6$] are each independently methyl, ethyl, isopropyl, tertbutyl, phenyl or the like, as for example;
  (1) tris-2,6-di-tert-butylphenoxy methyl zirconium;
  (2) tris-2,6-di-tert-butylphenoxy methyl hafnium:
(F) tris-2,4,6-trisubstituted phenoxy Group IVB transition metal compounds [$M(OR^1)_3X$; M is a Group IVB metal; $R^3$ and $R^5$ are hydrogen; X is a hydrocarbyl radical wherein the substituent groups [$R^2$, $R^4$, $R^6$] are each independently methyl, ethyl, isopropyl, tert-butyl, phenyl, or the like and the $R^4$ substituent may be an alkoxy or other univalent anionic ligand, as for example:
  (1) tris-2,6-di-tert-butyl-4-methoxy-phenoxy methyl zirconium;
  (2) tris-2,6-di-tert-butyl-4-methylphenoxy methyl zirconium:
(G) bis-2,6-disubstituted phenoxy Group IVB transition metal compounds [$M(OR^1)_2X_2$; M is a Group IVB metal; $R^3$, $R^4$ and $R^5$ are hydrogen; X is halogen, hydrocarbyl, hydrocarbyloxide or amide] wherein the substituents [$R^2$ and $R^6$] are independently methyl, ethyl, isopropyl, tert-butyl, phenyl, or the like, as for example;
  (1) bis-2,6-di-tert-butyl-4-methylphenoxy zirconium dichloride;
  (2) bis-2,6-di-tert-butyl-4-methylphenoxy-tert-butoxy titanium chloride:
(H) bis-2,4,6-trisubstituted phenoxy Group IVB transition metal compounds [$M(OR^1)_2X_2$; M is a Group IVB metal; $R^3$ and $R^5$ are hydrogen; X is halogen, hydrocarbyl, hydrocarbyloxide or amide] wherein the substituents [$R^2$, $R^4$, $R^6$] are each, independently, methyl, ethyl, isopropyl, tert-butyl, phenyl, or the like, and the $R^4$ substituent may be an alkoxy or any other univalent anionic ligand for example:
  (1) bis-2,6-di-tert-butyl-4-methylphenoxy zirconium dichloride;
  (2) bis-2,6-di-tert-butyl-4-methylphenoxy-tert-butoxy titanium chloride.
(I) pentakis-phenoxy Group VB transition metal compounds, for example:
  (1) pentakis-phenoxy tantalum;
  (2) pentakis-phenoxy niobium:
(J) pentakis-2,6-disubstituted phenoxy Group VB transition metal compounds [$M(OR^1)_5$; M is a Group VB metal; $R^3$, $R^4$ and $R^5$ are hydrogen] wherein the substituents [$R^2$ and $R^6$] are each, independently, hydrogen, methyl, ethyl, propyl, or the like, for example;
  (1) pentakis-2,6-dimethylphenoxy tantalum;
  (2) pentakis-2,6-dimethylphenoxy niobium:
(K) pentakis-2,4,6-trisubstituted phenoxy Group IVB transition metal compounds [$M(OR^1)_5$; M is a Group VB metal; $R^3$ and $R^5$ are hydrogen] wherein the substitutes [$R^2$ and $R^6$] are each, independently, hydrogen, methyl, ethyl, propyl, or the like and the $R^4$ substituent may be an alkoxy or other univalent anionic ligand, for example;

(1) pentakis-2,4,6-trimethyl phenoxy tantalum;
(2) pentakis-2,4,6-trimethyl phenoxy niobium:

(L) tetrakis-2,6-disubstituted phenoxy Group VB metal compounds [M(OR$^1$)$_4$X; M is a Group VB metal; R$^3$, R$^4$ and R$^5$ are hydrogen; X is halogen, hydrocarbyl, hydrocarbyloxide or amide] wherein the substituents [R$^2$ and R$^6$] are each independently methyl, ethyl, propyl, or the like, for example;
  (1) tetrakis-2,6-dimethylphenoxy methyl tantalum;
  (2) tetrakis-2,6-dimethylphenoxy methyl niobium;
  (3) tetrakis-2,6-dimethyl phenoxy tantalum chloride;
  (4) tetrakis-2,6-dimethyl phenoxy niobium chloride:

(M) tetrakis-2,4,6-trisubstituted phenoxy Group IVB transition metal compounds [M(OR$^1$)$_4$X; M is a Group VB metal; R$^3$ and R$^5$ are hydrogen; X is a halogen, hydrocarbyl, hydrocarbyloxide or amide] wherein the substitutes [R$^2$, R$^4$ and R$^6$] are each independently methyl, ethyl, propyl, or the like and the R$^4$ substituent may be an alkoxy or other univalent anionic ligand, for example;
  (1) tetrakis-2,4,6-trimethyl phenoxy tantalum chloride;
  (2) tetrakis-2,4,6-trimethyl phenoxy niobium chloride;

(N) tris-2,6-disubstituted Group VB metal compounds [M(OR$^1$)$_3$X$_2$; M is a Group VB metal; R$^3$, R$^4$ and R$^5$ are hydrogen; X is halogen, hydrocarbyl, hydrocarbyloxide or amide] wherein each substituent [R$_2$ and R$^6$] is, independently, methyl, ethyl, isopropyl, tert-butyl, phenyl or the like, for example;
  (1) tris-2-methyl-6-tert-butylphenoxy tantalum dichloride;
  (2) tris-2-methyl-6-tert-butylphenoxy niobium dichloride;
  (3) tris-2,6=dimethylphenoxy dibenzyl tantalum:

(O) tris-2,4,6-trisubstituted Group VB metal compounds [M(OR$^1$)$_3$X$_2$; M is a Group VB metal; R$^3$ and R$^5$ are hydrogen; X is halogen, hydrocarbyl, hydrocarbyloxide or amide] wherein each substituent [R$^2$, R$^4$ and R$^6$] is independently, methyl, ethyl, isopropyl, tert-butyl, phenyl or the like and the R$^4$ substituent may be alkoxy or any other univalent anionic ligand, for example;
  (1) tris-2,6-diphenyl-4 methylphenoxy tantalum dichloride;
  (2) tris-2,4-dimethyl-4-tert-butylphenoxy tantalum dichloride:

(P) bis-2,6-disubstituted phenoxy Group VB transition metal compounds [M(OR$^1$)$_2$X$_3$; M is a Group VB metal; X is halogen, hydrocarbyl, hydrocarbyloxide or amide; R$^3$, R$^4$ and R$^5$ are hydrogen] where the substituents [R$^2$ and R$^6$] are, independently, methyl, ethyl, isopropyl, tert-butyl, phenyl or the like, for example;
  (1) bis-2,6-di-tert-butylphenoxy trimethyl niobium;
  (2) bis-2,6-dimethylphenoxy tribenzyl tantalum;
  (3) bis-2,6-diphenylphenoxy tantalum trichloride;
  (4) bis-2,4-di-tert-butylphenoxy tris-trimethylsilyl methyl tantalum:

(Q) bis-2,4,6-trisubstituted phenoxy Group VB transition metal compounds [M(OR$^1$)$_2$X$_3$; M is a Group VB metal; X is halogen, hydrocarbyl, hydrocarbyloxide, or amide; R$^2$ and R$^5$ are hydrogen] wherein the substituents [R$^2$, R$^4$, R$^6$] are methyl, ethyl, isopropyl, tert-butyl, phenyl or the like and the R$^4$ substituent may be an alkoxy or other univalent anionic ligand, for example;
  (1) bis-2,4,6-tri-tert-butylphenoxy tantalum trichloride;
  (2) bis-2,6-diphenyl-4-methylphenoxy tantalum trichloride:

(R) mono- or di- cyclometalated transition metal hydrocarbyloxide compounds [M(OR$^1$)$_y$X$_{n-y}$ wherein one or more of the R$^2$ or R$^6$ substituents become bonded to the transition metal (M) for example compounds represented by the formulas:

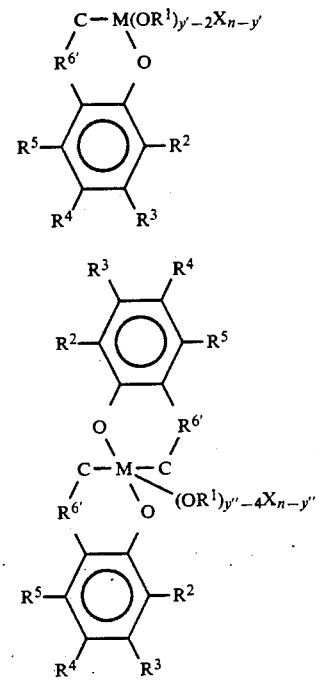

wherein R$^{6'}$ is an R$^6$ substituent where one carbon has become bonded to the transition metal with retention of the carbons valency of four by loss of an attached ligand, most likely being a proton; illustrative examples include:

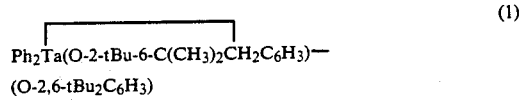
(1)

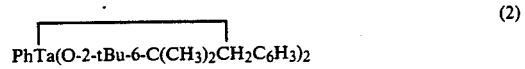
(2)

(S) alkylidene derivatives of transition metal hydrocarbyloxide compounds [M(OR$^1$)$_y$X$_{n-y}$ wherein at least a quantity of the n−y value for X is supplied by an alkylidene radical—i.e., 2 values of X fulfilled by an alkylidene radical], for example compounds represented by the formulas:
  (1) Ta(OR$^1$)$_2$(=CHSi(CH$_3$)$_3$)(CH$_2$Si(CH$_3$)$_3$), R$^1$=2,6-tBu$_2$C$_6$H$_3$;
  (2) Ta(OR$^1$)$_2$(=CH(C$_6$H$_5$))(CH$_2$(C$_6$H$_5$)), R$^1$=2,6-tBu$_2$C$_6$H$_3$: and (T) polynuclear aromatic derivatives of transition metal hydrocarbyloxide compounds [M(OR')$_y$X$_{n-y}$ wherein at least two of the substituents R$^2$ to R$^6$ of at least one R$^1$ radical are a single hydrocarbylene radical], for example:
  (1) tetrakisnaphthoxy zirconium;

(2) trisnaphthoxy hafnium chloride;
(3) bisnaphthoxy zirconium dichloride;
(4) tetrakisanthroxy zirconium;
(5) tetrakisbiphenoxy zirconium;
(6) trisnapthoxy tantalum dichloride;
(7) bisnapthoxy zirconium dichloride; and
(8) bisnapthoxy molybdenum tetrachloride.

Some of the transition metal compounds may be prepared by the reaction procedures described in: (1) L. R. Chamberlain, et al. *Inorg. Chem.* Vol. 23, p. 2575 (1984); (2) S. L. Latesky, et al.; *Inorg. Chem.*, Vol. 24, p. 995 (1985); (3) A. W. Duff, et al.; *J. Chem. Soc. Dalton Trans.*, p. 489 (1986).

The alumoxane component of the catalyst complex is an oligomeric aluminum compound which may be represented by the general formula $(R'—Al—O)_m$, which is a cyclic compound, or $R''(R'''—Al—O—)_m—AlR''''_2$, which is a linear compound, or is a mixture of the cyclic and linear species. In the general alumoxane formula each of $R'$, $R''$, $R'''$, and $R''''$ are a $C_1-C_5$ alkyl radical, for example, methyl, ethyl, propyl, butyl or pentyl and one or more of $R'$, $R''$, $R'''$ or $R''''$ may be a halide, and "m" is an integer from 1 to about 50. Most preferably, $R'$, $R''$, $R'''$ and $R''''$ are methyl and "m" is at least 4. Alumoxanes can be prepared by various procedures known in the art. For example, an aluminum alkyl may be treated with water in the form of a moist inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Suitable alumoxanes which are preferred for use in preparing catalyst systems of this invention are prepared by the hydrolysis of an trialkylaluminum, such as trimethylaluminum, triethylaluminum, tripropylaluminum, and triisobutylaluminum; or a dialkylaluminum halide such as dimethylaluminum chloride, diisobutylaluminum chloride, diethylaluminum chloride and the like. The most preferred alumoxanes for preparing catalyst systems of this invention are those prepared from trimethylaluminum. Particularly preferred are methylalumoxanes (MAO) having an average degree of oligomerization of from about 4 to about 25 ("m"=4 to 25), with the most preferred methylalumoxanes being of a degree of oligomerization ranging from about 13 to about 25 ("m"=13 to 25).

Catalyst Systems

The catalyst employed in the method of the invention comprises a system formed upon admixture of a Group IVB, VB or VIB transition metal hydrocarbyloxide with an alumoxane. The catalyst system may be prepared by addition of the requisite Group IVB, VB or VIB transition metal hydrocarbyloxide and alumoxane to an inert solvent or diluent in which polymerization can be carried out by solution, slurry or bulk phase polymerization procedures.

The catalyst system may be conveniently prepared by placing the selected transition metal hydrocarbyloxide compound and the selected alumoxane, in any order of addition, in an alkane or aromatic hydrocarbon solvent—preferably one which is also suitable for service as a polymerization diluent. Where the hydrocarbon solvent utilized is also suitable for use as a polymerization diluent, the catalyst system may be prepared in situ in the polymerization reactor by direct addition of the transition metal and alumoxane components to the polymerization diluent. Alternatively, the catalyst system may be separately prepared outside of the reactor, in concentrated form, and added to the polymerization diluent in a reactor. Or, if desired, the components of the catalyst system may be prepared as separate solutions and added to the polymerization diluent in a reactor, in appropriate ratios, as is suitable for a continuous liquid polymerization reaction procedure. Alkane and aromatic hydrocarbons suitable as solvents for formation of the catalyst system and also as a polymerization diluent are exemplified by, but are not necessarily limited to, straight and branched chain hydrocarbons such as isobutane, butane, pentane, hexane heptane, octane and the like, cyclic and alicyclic hydrocarbons such as cyclohexane, cycloheptane, methylcyclohexane, methylcyclopentane and the like, and aromatic and alkyl-substituted aromatic compounds such as benzene, toluene, xylene and the like. Suitable solvents also include liquid olefins which may act as monomers or comonomers including ethylene, propylene, 1-butene, 1-hexene and the like.

In accordance with this invention optimum results are generally obtained wherein the transition metal hydrocarbyloxide compound is present in the polymerization diluent in a concentration of from about 0.0001 to about 1.0 millimoles/liter of diluent and the alumoxane component is present in an amount to provide a molar aluminum to transition metal ratio of from about 1:1 to about 20,000:1. Sufficient solvent should be employed so as to provide adequate heat transfer away from the catalyst components during reaction and to permit good mixing.

The catalyst system ingredients—that is, the transition metal hydrocarbyloxide compound, the alumoxane, and polymerization diluent can be added to the reaction vessel rapidly or slowly. The temperature maintained during the contact of the catalyst components can vary widely, such as, for example, from −10° to 300° C. Greater or lesser temperatures can also be employed. Preferably, during formation of the catalyst system, the reaction is maintained within a temperature of from about 25° to 100° C., most preferably about 25° C.

At all times, the individual catalyst system components, as well as the catalyst system once formed, are protected from oxygen and moisture. Therefore, the reactions are performed in an oxygen and moisture free atmosphere and, where the catalyst system is recovered separately it is recovered in an oxygen and moisture free atmosphere, Preferably, therefore, the reactions are performed in the presence of an inert dry gas such as, for example, helium or nitrogen.

Polymerization Process

In a preferred embodiment of the process of this invention the catalyst system is utilized in the liquid, solution, slurry, bulk, high pressure fluid or gas phase polymerization of an olefin monomer. These processes may be employed singularly or in series. The liquid phase process comprises the steps of contacting an olefin monomer with the catalyst system in a suitable polymerization diluent and reacting said monomer in the presence of said catalyst system for a time and at a temperature and pressure sufficient to produce a polyolefin of high molecular weight.

The monomer for such process may comprise ethylene alone, for the production of a homopolyethylene, or ethylene in combination with an α-olefin having 3 to 20 carbon atoms for the production of an ethylene-α-olefin copolymer. Homopolymers of higher α-olefin such as propylene, and copolymers thereof with ethylene and/or C$_4$ or higher α-olefins and diolefins can also be prepared. Conditions most preferred for the homo- or co-polymerization of ethylene are those wherein ethylene is submitted to the reaction zone at pressures of from about 0.019 psia to about 50,000 psia and the reaction temperature is maintained at from about −100° C. to about 300° C. The aluminum to transition metal molar ratio is preferably from about 1:1 to about 18,000:1. A more preferable range would be 1:1 to 1000:1. The reaction time is preferably from about 1 minute to about 1 hour.

In accordance with one of the processes of this invention, a polyolefin is produced by solution polymerization utilizing ethylene, an α-olefin monomer having 3 to 20 carbon atoms or mixture of such monomers in a polymerization diluent to produce a homopolyolefin or a copolymer of ethylene and a α-olefin. Ethylene is added to the reaction vessel in an amount sufficient to produce the desired ethylene content in the polyolefin product. The differential pressure of ethylene, in excess of the vapor pressure of the α-olefin monomer, required to produce a given ethylene content depends on the particular transition metal hydrocarbyloxide used. Generally the polymerization process is carried out at an ethylene differential pressure of from about 10 to about 1000 psi, most preferably from about 40 to about 600 psi; and the polymerization diluent is maintained at a temperature of from about −50 to about 250° C.; preferably from about −10 to about 220° C. Under the conditions as indicated above, the ethylene and/or α-olefin monomers polymerize to a polyolefin.

Without limiting in any way the scope of the invention, one means for carrying out the process of the present invention is as follows: in a stirred-tank reactor liquid 1-butene monomer is introduced. The catalyst system is introduced via nozzles in either the vapor or liquid phase. Feed ethylene gas is introduced either into the vapor phase of the reactor, or sparged into the liquid phase as is well known in the art. The reactor contains a liquid phase composed substantially of liquid 1-butene together with dissolved ethylene gas, and a vapor phase containing vapors of all monomers. The reactor temperature and pressure may be controlled via reflux of vaporizing α-olefin monomer (autorefrigeration), as well as by cooling coils, jackets etc. The polymerization rate is controlled by the concentration of catalyst. The ethylene content of the polymer product is determined by the ratio of ethylene to 1-butene in the reactor, which is controlled by manipulating the relative feed rates of these components to the reactor.

EXAMPLES

In the Examples which illustrate the practice of the invention the analytical techniques described below were employed for the analysis of the resulting polyolefin products. Molecular weight determinations for polyolefin products were made by gel permeation chromatography (GPC) according to the following technique. Molecular weights and molecular weight distributions were measured using a Waters 150 gel permeation chromatograph equipped with a differential refractive index (DRI) detector and a Chromatix KMX-6 on-line light scattering photometer. The system was used at 135° C. with 1,2,4-trichlorobenzene as the mobile phase. Shodex (Showa Denko America, Inc.) polystyrene gel columns 802, 803, 804 and 805 were used. This technique is discussed in "Liquid Chromatography of Polymers and Related Materials III", J. Cazes editor, Marcel Dekker, 1981, p. 207 which is incorporated herein by reference. No corrections for column spreading were employed; however, data on generally accepted standards, e.g. National Bureau of Standards Polyethylene 1484 and anionically produced hydrogenated polyisoprenes (an alternating ethylene-propylene copolymer) demonstrated that such corrections on Mw/Mn (=MWD) were less than 0.05 units. Mw/Mn was calculated from elution times. The numerical analyses were performed using the commercially available Beckman/CIS customized LALLS software in conjunction with the standard Gel Permeation package, run on a HP 1000 computer.

The following examples are intended to illustrate process and product properties of specific embodiments of the invention and are not intended to limit the scope of the invention.

All procedures were performed under an inert atmosphere of helium or nitrogen. Solvent choices were often optional, for example, in most cases either pentane or 30–60 petroleum ether could be interchanged. The lithiate alkoxides were prepared from the corresponding alcohols and either n-BuLi or MeLi. ZrCl$_4$, HfCl$_4$ and TaCl$_5$ were purchased from Aldrich Chemical Co., Strem or Cerac. Most alcohols were purchased from Aldrich. Methylalumoxane was supplied by either Sherring or Ethyl Corp.

Examples A–F of Group IVB and VB Transition Metal Hydrocarbyloxide Components

Example A

Compound A

ZrCl$_4$ (1.0 g, 0.0043 mol) was suspended in ~30 ml of ether. Lithium 2,6-di-t-butylphenoxide, LiOR (2.73 g, 0.0129 mol) R=2,6-t-Bu$_2$C$_6$H$_3$ was slowly added and the mixture was allowed to stir for several hours. The reaction solvent was then removed via vacuum, and toluene was added to the mixture. The mixture was then filtered through Celite to remove the LiCl. The toluene was removed via vacuum and ~10 ml petroleum ether was added. The flask was cooled to ~40° C. for about one hour to maximize precipitation. The white product was filtered off and washed with two small aliquots of petroleum ether. The filtrate was reduced in volume to precipitate out additional product. This too was filtered off, washed and added to the previous fraction. The yield of Zr(OR)$_3$Cl, R=2,6-t-Bu$_2$C$_6$H$_3$, was 81% (2.59 g, 0.0035 mol).

Example B

Compound B

HfCl$_4$ (1.5 g, 0.0047 mol) was suspended in ~50 ml of ether. Lithium 2,6-di-t-butylphenoxide, LiOR (3.03 g, 0.0143 mol) R=2,6-t-Bu$_2$C$_6$H$_3$ was slowly added to the mixture and allowed to stir for several hours. The ether was then removed via vacuum, toluene was added to solubilize the product and precipitate out the LiCl. The mixture was filtered through Celite, and the toluene was reduced in volume and petroleum ether was added to precipitate out the product. The white solid was filtered off and washed with a small portion of petroleum ether.

15

Hf(OR)₃Cl, R=2,6-7-Bu₂C₆H₃, was isolated in a 67% yield (2.61 g, 0.0031 mol).

Example C

Compound C

TaCl₅ (1.0 g, 0.0028 mol) was suspended in ~50 ml of toluene. Lithium 2,6-di-t-butylphenoxide, LiOR (1.19 g, 0.0056 mol) R=2,6-t-Bu₂C₆H₃ was slowly added and the mixture was allowed to stir for several hours. The mixture was filtered through Celite to remove the LiCl. The toluene was evaporated off and petroleum ether was added to precipitate out the product. The orange solid wa filtered off and washed with petroleum ether. The filtrate was reduced in volume in order to precipitate out additional product. This too was filtered off giving Ta(OR)₂Cl₃, R=2,6-t-Bu₂C₆H₃, in a total yield of 51% (1.0 g, 0.0014 mol).

Example D

Compound D

Lithium 4-methyl-2,6-di-t-butylphenoxide, LiOR (2.185 g, 0.010 mol) R=4-Me-2,6-t-Bu₂C₆H₃ was suspended in ~100 ml of benzene. ZrCl₄ (0.75 g, 0.0032 mol) was slowly added and the mixture was allowed to stir for several hours. The LiCl was then removed from the mixture by filtration through Celite. The solvent was then removed via vacuum transfer. Pentane was added to redissolve the material and the resulting solution was placed in a refrigerator at ~40° C. which induced precipitation within one hour. The white solid was filtered off and washed with cold pentane. Repetition of the recrystallization procedure using the filtrate yielded a total of 0.73 g Zr(OR)₂Cl₃, R=4-Me-2,6-t-Bu₂C₆H₃ (29% yield).

Example E

Compound E

Lithium 4-methyl-2,6-di-t-butylphenoxide, LiOR (1.29 g, 0.0057 mol) R=4-Me-2,6-t-Bu₂C₆H₂ was suspended in ~100 ml of toluene. TaCl₅ (1.0 g, 0.0028 mol) was slowly added and the mixture was allowed to stir for several hours. The mixture was filtered through Celite to remove the LiCl. The solid was removed via vacuum to recover an orange solid which was washed with pentane. The product, Ta(OR)₂Cl₃, R=4-Me-2,6-t-Bu₂C₅H₂, was recovered in a 72% yield (1.45 g, 0,0020 mol).

Example F

Compound F

Lithium 2,6-di-t-butyl-4-methoxy phenoxide, LiOR (2.4 g, 0.0099 mol) R=2,6-t-Bu-4-OMe-CH was suspended in ~100 ml of toluene. ZrCl₄ (0.75 g, 0.0032 mole) was slowly added and the mixture was allowed to stir for several hours. The mixture was filtered through Celite to remove the LiCl. The toluene was evaporated off giving a pale yellow solid which was washed with small portions of solvent. Zr(OR)₃Cl, R=2,6-t-Bu-4-OMe-C₆H₂, was recovered in a 43% yield (1.15 g, 0.0014 mole).

Examples 1-14 of Polymerization

Example 1

Polymerization Compound A

The polymerization was performed in a 1-liter autoclave reactor equipped with a paddle stirrer, and external water jacket for temperature control, a regulated supply of dry nitrogen, ethylene, propylene, 1-butene and hexane, and a septum inlet for introduction of other solvents, transition metal compound and alumoxane solutions. The reactor was dried and degassed thoroughly prior to use. A typical polymerization consisted of injecting 400 ml of toluene, 5.0 ml of 1.0 M MAO (methylalumoxane), and 0.416 mg of compound A (0.4 ml of a 10.4 mg in 10 ml of i5 toluene solution) into the reactor. The reactor was then heated to 80° C. and the ethylene (60 psi) was introduced into the system. The duration of the polymerization reaction was limited to 30 minutes. The reaction was terminated by rapidly cooling and venting the system. The solvent was then evaporated by a stream of nitrogen and 1.3 g of polyethylene was recovered (MW=359,200, MWD=2.036).

Example 2

Polymerization—Compound A

Using the same reactor design and general procedure as in Example , the same polymerization run was repeated except using a compound A solution that had been aged for one day. All other reaction conditions remained the same. Polyethylene was recovered (1.4 g) (MW=373,600, MWD=1.966).

Example 3

Polymerization—Compound A

Using the same reactor design and general procedure as in Example 1, the same polymerization run was repeated except using a compound A solution that had been aged for one week. All other reaction conditions remained the same. Polyethylene was recovered (1.4 g) (MW=393,300, MWD=2.105).

Example 4

Polymerization—Compound B

Using the same reactor design and general procedure as in Example 1, the same polymerization run was made with the exception of using 0.464 mg of compound B (0.4 ml of a 11.6 mg in 10 ml of toluene solution) instead of Compound A. All other reaction conditions remained the same. Polyethylene was recovered (1.2 g) (MW=360,100, MWD=1.886)

Example 5

Polymerization—Compound C

Using the same reactor design and general procedure as in Example 1, the same polymerization run was made with the exception of using 0.39 mg of compound C (0.4 ml of a 9.75 mg in 10 ml of toluene solution) instead of compound A. All other reaction conditions remained the same. Polyethylene was recovered (1.3 g) (MW=381,700, MWD=1.963).

Example 6

Polymerization—Compound D

Using the same reactor design and general procedure as in Example 1, the same polymerization run was made with the exception of using 0.44 mg of compound D (0.4 ml of a 11.0 mg in 10 ml of toluene solution) instead of compound A. All other reaction conditions remained the same. Polyethylene was recovered (1.4 g) (MW=536,500, MWD=1.996).

Example 7

Polymerization—Compound E

Using the same reactor design and general procedure as in Example 1, the same polymerization run was made with the exception of using 0.404 mg of Catalyst E (0.4 ml of a 10.1 mg in 10 ml of toluene solution) instead of compound A. All other reaction conditions remained the same. Polyethylene was recovered (1.5 g) (MW=352,700, MWD=1.978).

Example 8

Polymerization—Compound F

Using the same reactor design and general procedure as in Example 1, the same polymerization run was made with the exception of using 0.464 mg of compound F (0.4 ml of a 11.6 mg in 10 ml of toluene solution) instead of compound A. All other reaction conditions remained the same. Polyethylene was recovered (1.4 g) (MW=304,500, MWD=1.916).

Example 9

Polymerization—Compound A

Using the same reactor design and general procedure as in Example 1, 300 ml of toluene, 200 ml of propylene, 3.0 ml of 1.5 M MAO, and 0.20 mg of compound A (0.2 ml of a 10.0 mg in 10 ml of toluene solution) were introduced into the reactor. The reactor was heated to 60° C., ethylene was introduced (40 psi), and the reaction was allowed to run for 30 minutes, followed by rapid cooling and venting of the system. After evaporation of the solvent, 8.5 g of an ethylene-propylene copolymer were recovered having a molecular weight of 32,600 and a molecular weight distribution of 2.285 and containing 30.3 mole % propylene as determined by $^{13}$C NMR.

Example 10

Polymerization—Compound A

Using the same reactor design and general procedure already described, 400 ml of toluene, 1.0 ml of 1.0 M MAO, and 0.4 ml of a preactivated compound A solution (10.4 mg of compound A dissolved in 9.5 ml of toluene and 0.5 ml of 1.0 M MAO) were added to the reactor. The reactor was heated to 80° C., the ethylene was introduced (60 psi), and the reaction was allowed to run for 30 minutes, followed by rapidly cooling and venting the system. After evaporation of the solvent, 0.4 g of polyethylene was recovered (MW=393,400, MWD=1.966).

Example 11

Polymerization—Compound A

Using the same reactor design and general procedure already described, 400 ml of toluene, 0.5 ml of 1.0 M MAO, and 0.4 ml of a preactivated compound A solution (10.4 mg compound A dissolved in 9.5 ml of toluene and 0.5 ml of 1.0 M MAO) were added to the reactor. The reactor was heated to 80° C., the ethylene was introduced (60 psi), and the reaction was allowed to run for 30 minutes, followed by rapidly cooling and venting the system. After evaporation of the solvent, 0.2 g of polyethylene was recovered (MW=372,400, MWD=2.152).

Example 12

Polymerization—Compound C

Using the same reactor design and general procedure already described, 400 ml of toluene, 1.0 ml of 1.0 M MAO, and 0.4 ml of a preactivated compound C solution (9.75 mg of compound C dissolved in 9.5 ml of toluene and 0.5 ml of 1.0 MAO) were added to the reactor. The reactor was heated to 80° C., the ethylene was followed by rapidly cooling and venting the system. After evaporation of the solvent, 0.4 g of polyethylene was recovered (MW=399,700, MWD=2.093).

Example 13

Polymerization—Compound C

Using the same reactor design and general procedure already described, 400 ml of toluene, 0.5 ml of 1.0 M MAO, and 0.4 ml of a preactivated compound C solution (9.75 mg of compound C dissolved in 9.5 ml of toluene and 0.5 ml of 1.0 M MAO) were added to the reactor. The reactor was heated to 80° C., the ethylene was introduced (60 psi), and the reaction was allowed to run for 30 minutes, followed by rapidly cooling and venting the system. After evaporation of the solvent, 0.1 g of polyethylene was recovered (MW=428,700, MWD=2.218).

Example 14

Polymerization—Compound A

Using the same reactor design and general procedure already described in Example 1, the same polymerization run was repeated except for increasing the ethylene pressure to 400 psi. All other reaction conditions remained the same. Polyethylene was recovered (10.3 g) (MW=433,000, MWD=2.073)

Example 15

The polymerization was performed in a stirred 100 ml stainless steel autoclave which was equipped to perform polymerizations at pressures up to 40,000 psi and temperatures up to 300° C. The autoclave was purged with nitrogen and heated to 160° C. Solutions of compound A and alumoxane were prepared in separate vials. A stock solution was prepared by dissolving 13 mg of compound A in 25 ml of toluene. The compound A solution was prepared by diluting 0.5 ml of the stock solution with 5.0 ml of toluene. The alumoxane solution consisted of 2.5 ml of a 1.0 M MAO solution added to 5.0 ml of toluene. The compound A solution was added to the alumoxane solution; then 0.43 ml of the mixture was transferred under nitrogen pressure to a constant volume injection tube. The autoclave was pressurized with ethylene to 1701 bar and was stirred at 1500 rpm. The mixed solutions were injected into the autoclave with excess pressure, at which time a temperature rise of 22° C. was observed. The temperature and pressure were recorded for 120 seconds, after which the contents of the autoclave were vented rapidly into a receiving vessel. The autoclave was washed three times with xylene to recover any additional polymer remaining within. These washings were combined with the polymer released when the autoclave was vented to yield 2.45 g of polyethylene (MW=177,500, MWD=2.657).

Example 16

The polymerization was performed in the high pressure autoclave system described in Example 15. The comonomer, 1-hexene (75 ml), which had previously been dried over basic alumina was added to the reactor under ethylene pressure. A stock solution of compound A was prepared by dissolving 14.3 mg of compound A in 30.6 ml of toluene. The test solution was prepared by adding 2.5 ml of the compound A stock solution to 10 ml of a 10% MAO solution. The test solution (0.43ml) was transferred by nitrogen pressure into a constant volume injection tube. The autoclave was pressurized with ethylene to 1725 bar and was stirred at 1800 rpm. The test solution was injected into the autoclave with excess pressure, at which time a temperature rise of 13° C. was observed. The temperature and pressure were recorded continuously for 120 seconds, at which time the contents of the autoclave were rapidly vented into a receiving vessel. The reactor was washed with xylene to recover any polymer remaining within. These washings were combined with the polymer released when the reactor was vented. Precipitation of the polymer from the mixture by addition of acetone yielded 1.9 g of polymer (MW=52,400, MWD=2.592, 7.4 SCB/1000C).

Example 17

Using the same reactor design and general procedure as in Example 1, 300 ml of toluene, 100 ml of 1-butene, 7.0 ml of 1.0 M MAO and 4.16 mg of compound A (4.0 ml of a 10.4 mg in 10 ml of toluene solution) were introduced into the reactor. The reactor was heated to 80° C., ethylene was introduced (400 psi), and the reaction was allowed to run for 10 minutes, followed by rapid cooling and venting of the system. After evaporation of the solvent, 33.7 g of an ethylene-butene copolymer was recovered having a molecular weight of 348,100 and molecular weight distribution of 2.244 and containing 8.0 mole % of butene as determined by IR spectroscopy.

Example 18

Using the same reactor design and general procedure as in Example 1, 300 ml of toluene, 100 ml of propylene, 7.0 ml of 1.0 M MAO and 4.16 mg of compound A (4.0 ml of a 10.4 mg in 10 ml of toluene solution) were introduced into the reactor. The reactor was heated to 80° C., ethylene was introduced (100 psi), and the reaction was allowed to run for 10 minutes, followed by rapid cooling and venting of the system. After evaporation of the solvent, 31.0 g of an ethylene-propylene copolymer was recovered having a molecular weight of 128,700 and molecular weight distribution of 2.789 and containing 3.3 mole % of propylene as determined by IR spectroscopy.

Example 19

Using the same reactor design and general procedure as in Example 1, 300 ml of toluene, 100ml of 1-hexene, 7.0 ml of 1.0 M MAO and 4.16 mg of compound A (4.0 ml of a 10.4 mg in 10 ml of toluene solution) were introduced into the reactor. The reactor was heated to 80° C., ethylene was introduced (100 psi), and the reaction was allowed to run for 10 minutes, followed by rapid cooling and venting of the system. After evaporation of the solvent, 14.2 g of an ethylene-hexene copolymer was recovered having a molecular weight of 130,000 and molecular weight distribution of 2.097 and containing 3.71 mole % hexene as determined by NMR spectroscopy.

The invention has been described with reference to its preferred embodiments. Those skilled in the art may appreciate changes or modifications which do not depart from the scope and spirit of the invention described above or claimed hereafter.

I claim:

1. A catalyst system, effective for the production of polyolefins comprising;
   (a) a transition metal hydrocarbyloxide compound represented by the formula:

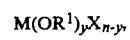

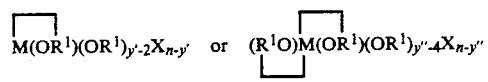

wherein M is a Group IVB, VB or VIB transition metal; each X is independently halogen, or a hydrocarbyl, alkoxy or amide group having from one to 30 carbon atoms; $R^1$ is a radical of the formula:

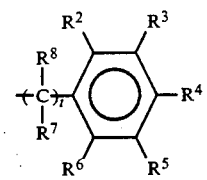

or

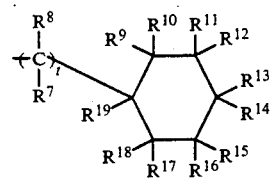

wherein "t" is an integer number of 0 to 10 and each of the $R^2$ to $R^{19}$ substituents are independently hydrogen, a halogen, a hydrocarbyl radical selected from the group consisting of a straight or branched chain alkyl group, an aryl group, an alkylaryl group, an arylalkyl group, a halogenated hydrocarbyl group, an alkoxy group, an amine group or at least two of the substituents $R^2$ to $R^6$ or $R^9$ to $R^{19}$ may be a single hydrocarbylene radical which forms a fused polycyclic ring system or polynuclear aromatic system, and $R^7$ and $R^8$ may independently be the same as the cyclic group, except when t=o then at least one of $R^2$–$R^6$ and $R^9$–$R^{19}$ is not hydrogen; "n" is a number at least equal to 4 and is equal to the valence of the transition metal M; "y" is a number equal to or greater than 2 and less than or equal to "n", "y'" is a number equal to or greater than 3 and less than or equal to "n", and "y''" is a number equal to or greater than 4 and less than or equal to "n", and
   (b) an alumoxane.

2. The catalyst system of claim 1, wherein the alumoxane is methylalumoxane.

3. The catalyst system of claim 2, wherein said methylalumoxane to transition metal mole ratio is from about 1:1 to about 1000:1.

4. The catalyst system of claim 1, wherein the $R^1$ hydrocarbyl radical is of the formula:

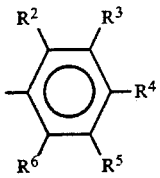

wherein: at least $R^2$ and $R^6$ are hydrocarbyl substituents and $R^4$ is hydrogen, or an alkyl, aryl, or alkoxy group.

5. The catalyst system of claim 4, wherein M is zirconium, hafnium, or tantalum.

6. The catalyst system of claim 4, wherein "y" is 2.

7. The catalyst system of claim 4, wherein "y" is 3.

8. The catalyst system of claim 4, wherein "y" is 4.

9. The catalyst system of claim 4, wherein "y" is 5 and M is a Group VB or VIB transition metal.

10. The catalyst system of claim 4, wherein the $R^4$ substituent is an alkyl, aryl or an alkoxy group.

11. The catalyst system of claim 4, wherein the $R^4$ substituent is hydrogen.

12. A catalyst system, effective for the production of polyolefins comprising a polymerization diluent containing;

(a) a transition metal hydrocarbyloxide compound represented by the formula:

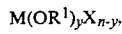

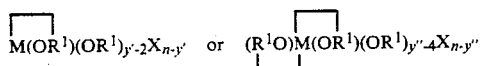

wherein M is a Group IVB, VB or VIB transition metal; each X is independently halogen, or a hydrocarbyl, alkoxy or an amide group having from one to 30 carbon atoms; $R^1$ is a hydrocarbyl radical of the formula:

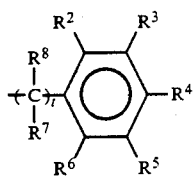

or

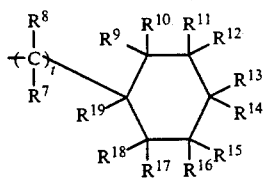

wherein "t" is an integer number of 0 to 10 and each of the $R^2$ to $R^{19}$ substituents are independently hydrogen, a halogen, a hydrocarbyl radical selected from the group consisting of a straight or branched chain alkyl group, an aryl group, an alkylaryl group, an arylalkyl group, a halogenated hydrocarbyl group, an alkoxy group, or an amine group, or at least two of the substituents $R^2$ to $R^6$ or $R^9$ to $R^{19}$ may be a single hydrocarbylene radical which forms a fused polycyclic ring system or polynuclear aromatic system, and $R^7$ and $R^8$ may independently be the same as the cyclic group, except when t=0 then at least one of $R^2$-$R^6$ and $R^9$-$R^{19}$ is not hydrogen; "n" is a number at least equal to 4 and is equal to the valence of the transition metal M; "y" is a number equal to or greater than 2 and less than or equal to "n", "y'" is a number equal to or greater than 3 and less than or equal to "n", and "y''" is a number equal to or greater than 4 and less than or equal to "n", and (b) an alumoxane;

wherein the transition metal hydrocarbyloxide is present in said polymerization diluent in an amount from about 0.0001 to about 1.0 millimoles per liter.

13. The catalyst system of claim 12, wherein the alumoxane is methylalumoxane.

14. The catalyst system of claim 13, wherein said methylalumoxane to transition metal mole ratio is from about 1:1 to about 1000:1.

15. The catalyst system of claim 13, wherein the $R^1$ hydrocarbyl radical is of the formula

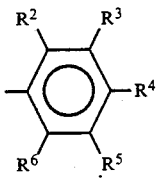

wherein: at least $R^2$ and $R^6$ are hydrocarbyl substituents and $R^4$ is hydrogen, or an alkyl, aryl, or alkoxy group.

16. The catalyst system of claim 15, wherein M is zirconium, hafnium, or tantalum.

17. The catalyst system of claim 15, wherein the polymerization diluent is an alkane or aromatic hydrocarbon.

18. The catalyst system of claim 15, wherein the $R^4$ substituent is an alkyl, aryl or an alkoxy group.

19. The catalyst system of claim 15, wherein the $R^4$ substituent is hydrogen.

* * * * *